United States Patent Office 3,254,946
Patented June 7, 1966

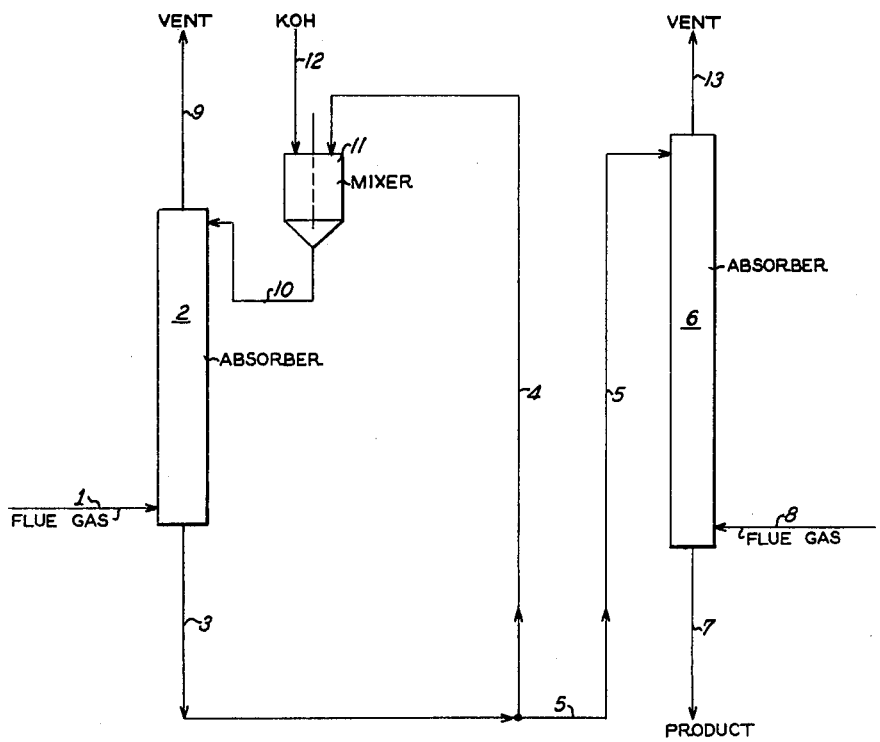

3,254,946
PROCESS FOR THE MANUFACTURE OF POTASH SOLUTIONS INCLUDING PRE-CARBONATION
Karl W. Hass, Ranzel uber Troisdorf, and Otto Bleh, Mondorf uber Troisdorf, Germany, assignors to Dynamit Nobel Aktiengesellschaft, Patent Abteilung Troisdorf, Germany, a corporation of Germany
Filed Nov. 17, 1964, Ser. No. 411,940
7 Claims. (Cl. 23—63)

The present invention relates to a process for the manufacture of potash solutions and more particularly relates to a process of manufacture of potash solutions by substantially complete quantitative absorption of carbon dioxide from solutions of KOH in which the absorption is carried out in two stages, utilizing in the first stage a pre-carbonated KOH solution.

It has been proposed to manufacture potash by treating potassium hydroxide solutions with pure or dilute carbon dioxide. This process can be carried out both continuously and discontinuously, and both procedures are in technical use. The carbon dioxide required is used for the most part in dilute form and preferably as it occurs, for example, in flue gas, which has been freed of dust and washed prior to use. Such gas usually contains 10 to 12% by volume of carbon dioxide. In the prior potash manufacturing processes, the reactions could be carried out only to the degree that the exhaust gas still contained at least 5% by volume of carbon dioxide. However, even when pure carbon dioxide was used, losses of the same degree occurred if the processes were limited only to a single passage of the gas. Several processes have been proposed whereby quantitative conversion of the carbon dioxide and potassium hydroxide was attempted. These processes, in general, consist in using a reaction chamber of special design and circulating the liquid phase therein. For this purpose a column was employed as the absorption chamber as the same offers an optimum liquid surface for absorption. One of the major difficulties encountered in such procedures was the precipitation and crystallization which occurred, and specifically the formation of potassium bicarbonate, potash hydrate, and mixtures thereof. As the quantity of these crystals in the system increased, plant operation had to be interrupted. The possibility of preventing crystalline salt formation by sufficiently diluting the KOH solutions produced by the electrolysis with water has the disadvantage that this additional amount of water has to be evaporated off before the potash can be recovered.

A principal object of this invention is the provision of a process operative to obtain high transformation of the $CO_2$ content of KOH solutions to potash.

A further object of this invention is a process for producing potash by treating KOH solutions with $CO_2$ not requiring any special construction of apparatus.

Still a further object of this invention is a process for producing potash by treating KOH solutions with $CO_2$, avoiding the disadvantage of clogging of the apparatus due to the presence of crystalline material in the KOH liquors in the system.

Other objects of this invention will be apparent to those skilled in the art from inspection of the following description.

In accordance with the invention, the disadvantages above referred to are avoided and high transformation of the $CO_2$ and KOH to potash achieved by carrying out the contacting of the KOH solution with the carbon dioxide in two stages, utilizing in the first stage for the absorbent solution a precarbonated KOH solution, having been originally an approximately 50 wt. percent KOH solution. The KOH content of the precarbonated solution is converted up to 90% of theory into $K_2CO_3$. Generally 70–90% of the KOH, preferably 85–90%, are converted.

Furthermore, according to a preferred mode of practicing the invention, a quantity amounting to nine-tenths of the liquid phase circulating product is withdrawn for recirculation. Fresh 50 wt. percent KOH is then added to the withdrawn nine-tenths of circulation product held in a mixing chamber. The fresh KOH is added in an amount constituting a 10% excess referred to the amount of carbon dioxide to be absorbed. The product as formed in the mixing chamber serves as an absorbent and is recycled directly into the entrance to the first absorption stage. In the process of the invention, a possible potash separation due to superconcentration of KOH is limited to the mixing chamber. The remainder of the reaction apparatus, however, remains completely free from any precipitation of potash. The super-concentration in the mixture which does occur can be prevented by injecting the KOH into the circulating liquid in a free stream and by sufficiently rapid stirring in the mixer, and by applying a temperature exceeding 30° C.

The remaining one-tenth of the product withdrawn from the first absorptive stage is fed to a second absorptive stage. In the latter, the balance of the KOH is converted by a second passage of the liquid phase in counterflow to a calculated amount of carbon dioxide. This eliminates super-concentrations of carbon dioxide and, as a result, also the over-carbonation which previously resulted in the precipitation of potassium bicarbonate.

The advantages of the new process are the following:

(1) The use of KOH solutions as they are supplied by the electrolysis of KCl solutions, and in the undiluted stage;
(2) The complete transformation of the carbon dioxide supplied in a single gas passage through the absorber, and independently of its concentration;
(3) The avoidance of potash or bicarbonate precipitation in the absorbent solutions.

The advantages of the present process permit, furthermore, a not inconsiderable increase in the practical safety of operation of absorption plants for the manufacture of potash solutions.

The invention, its more particular objects and advantages, may be understood from the following example, taken in connection with the accompanying drawing showing, diagrammatically, apparatus in which a preferred embodiment of the invention may be carried out.

Example 900.5 g./h. of 50 wt. percent KOH were introduced through line 12 into the mixing chamber 11. At the same time, approximately 9520 g./h. of the reaction solution produced in absorber 2 were fed from that absorber 2 through lines 3 and 4 into mixing chamber 11. The resultant solution in chamber 11 was thereafter passed through line 10 to the head of the absorber 2. 800 l./h. (measured under standard conditions) of flue gas having a $CO_2$ content of 10% by volume were supplied simultaneously from conduit 1 to the bottom of absorber 2. A flue gas substantially free of $CO_2$ was discharged from absorber 2 through line 9. The reaction product which was produced in absorber 2 was conducted through 5 into the head of absorber 6. 99 l./h. of flue gas, measured under standard conditions, and having a $CO_2$ content amounting to 10% by volume, were fed from conduit 8 into the bottom of absorber 6. Flue gas substantially free of $CO_2$ was discharged from 13. The solution flowing from 7 was substantially free of KOH and $KHCO_3$. The flue gas temperature amounted to about 30° C.; the temperature of the KOH was between about 20 and 50° C.

For the reasons described earlier, a temperature ranging from 40 to 100° C. is required to be established in the absorption stages.

The invention is not, of course, restricted to the example of embodiment represented and described. Instead, many variations can be made without departing from the essence of the invention.

What is claimed is:

1. The method for producing potash by carbonation of a potassium hydroxide solution with carbon dioxide, which comprises in a first step passing a $CO_2$-containing gas into a first absorption zone in counterflow contact with a pre-carbonated KOH solution, withdrawing the reaction solution from said first absorption zone, mixing a major portion of said withdrawn reaction solution with a fresh amount of the KOH solution and re-introducing said latter resulting solution into the first absorption zone for further counterflow contact with $CO_2$-containing gas, passing the remaining portion of said withdrawn reaction solution into a second absorption zone for counterflow contact with a $CO_2$-containing gas therein, said $CO_2$ being present in said latter gas in an amount at least equal to that required to complete the carbonation and recovering the potassium carbonate solution thereby produced.

2. Method according to claim 1, wherein the KOH content of the pre-carbonated KOH solution utilized in said first stage is converted up to 90% of theory into $K_2CO_3$.

3. Method according to claim 1, wherein the KOH solution admixed with said withdrawn reaction solution is 50% KOH.

4. Method according to claim 1, wherein approximately nine-tenths of the reaction solution withdrawn from said first absorption zone is back-mixed with fresh KOH solution.

5. Method according to claim 1, which comprises maintaining the temperature in each of said absorption zones within the range of from 40 to 100° C.

6. Method according to claim 1, which comprises maintaining the temperature during the mixing of the fresh KOH solution and withdrawn reaction solution above 30° C.

7. Method according to claim 1, wherein said $CO_2$-containing gas is flue gas having a $CO_2$ content of 10% by volume.

References Cited by the Examiner

UNITED STATES PATENTS

| | | | |
|---|---|---|---|
| 1,562,891 | 11/1925 | Klopstock et al. | 23—63 |
| 2,761,755 | 9/1956 | Brown | 23—2 |

FOREIGN PATENTS 562,544  7/1944  Great Britain.

OTHER REFERENCES

Benson et al.: "$CO_2$ Absorption," Chemical Engineering Progress, volume 50, No. 7, pages 356–364 (July 1954).

OSCAR R. VERTIZ, *Primary Examiner.*

BENJAMIN HENKIN, *Examiner.*

G. OZAKI, *Assistant Examiner.*